(12) United States Patent
Provost et al.

(10) Patent No.: US 9,326,580 B2
(45) Date of Patent: May 3, 2016

(54) SHAVING ASSEMBLY DISPENSER

(71) Applicant: SHAVELOGIC, INC., Dallas, TX (US)

(72) Inventors: Craig A. Provost, Providence, RI (US); John W. Griffin, Moultonborough, NH (US); William E. Tucker, Attleboro, MA (US)

(73) Assignee: SHAVELOGIC, INC., Plano, TX (US)

( * ) Notice: Subject to any disclaimer, the term of this patent is extended or adjusted under 35 U.S.C. 154(b) by 78 days.

(21) Appl. No.: 14/101,163

(22) Filed: Dec. 9, 2013

(65) Prior Publication Data

US 2015/0157109 A1 Jun. 11, 2015

(51) Int. Cl.
| | |
|---|---|
| *A45D 27/22* | (2006.01) |
| *B65G 11/12* | (2006.01) |
| *B65D 83/10* | (2006.01) |
| *B26B 19/38* | (2006.01) |
| *B26B 21/40* | (2006.01) |
| *B65D 6/06* | (2006.01) |
| *B65D 5/72* | (2006.01) |
| *B65D 43/12* | (2006.01) |

(52) U.S. Cl.
CPC .............. *A45D 27/225* (2013.01); *A45D 27/22* (2013.01); *B26B 19/3853* (2013.01); *B26B 21/4012* (2013.01); *B65D 83/10* (2013.01); *B65G 11/12* (2013.01); *B65D 5/723* (2013.01); *B65D 7/10* (2013.01); *B65D 9/08* (2013.01); *B65D 43/12* (2013.01); *B65D 2251/023* (2013.01); *B65D 2251/04* (2013.01); *B65D 2583/0454* (2013.01); *Y10T 29/49826* (2015.01)

(58) Field of Classification Search
CPC .. B65D 85/10; B65D 2583/0454; B65D 7/10; B65D 11/12; B65D 9/08; B65D 5/646; B65D 5/723; B65D 5/38; B65D 43/12; B65D 43/20; B65D 1/24; B65D 2501/24; A45D 27/225; A45D 27/22; A45D 27/00; B26B 19/38; B26B 19/3853; B26B 19/3846; B26B 21/40; B26B 21/4012
See application file for complete search history.

(56) References Cited

U.S. PATENT DOCUMENTS

| | | | | |
|---|---|---|---|---|
| 4,007,828 | A | * | 2/1977 | Mayled .......................... 206/1.5 |
| 4,831,729 | A | * | 5/1989 | Beuchat ........................ 30/40.2 |
| 5,275,291 | A | * | 1/1994 | Sledge .......................... 206/531 |
| 5,518,114 | A | | 5/1996 | Kohring et al. |
| 6,041,926 | A | | 3/2000 | Petricca et al. |
| 2004/0181949 | A1 | | 9/2004 | Coffin et al. |
| 2009/0056151 | A1 | * | 3/2009 | Kohring et al. ................. 30/541 |
| 2009/0152134 | A1 | * | 6/2009 | Katsis .............................. 206/96 |
| 2010/0133140 | A1 | | 6/2010 | Bailey et al. |
| 2011/0233229 | A1 | | 9/2011 | Schekalla |

OTHER PUBLICATIONS

International Search Report/Written Opinion—Corresponding PCT Application No. PCT/US2014/065076, dated Feb. 16, 2015, 18 pages.

* cited by examiner

*Primary Examiner* — Anthony Stashick
*Assistant Examiner* — Mollie Llewellyn
(74) *Attorney, Agent, or Firm* — Leber Patent Law P.C.

(57) ABSTRACT

Containers are described herein for the transportation and distribution of replaceable consumer products, e.g. interchangeable shaving assemblies. The containers described herein include a mechanism to securely hold the container in predetermined open and closed positions. The interior of the container may provided features which serve to hold and protect the shaving assemblies when not in use, e.g., during transport or storage.

6 Claims, 17 Drawing Sheets

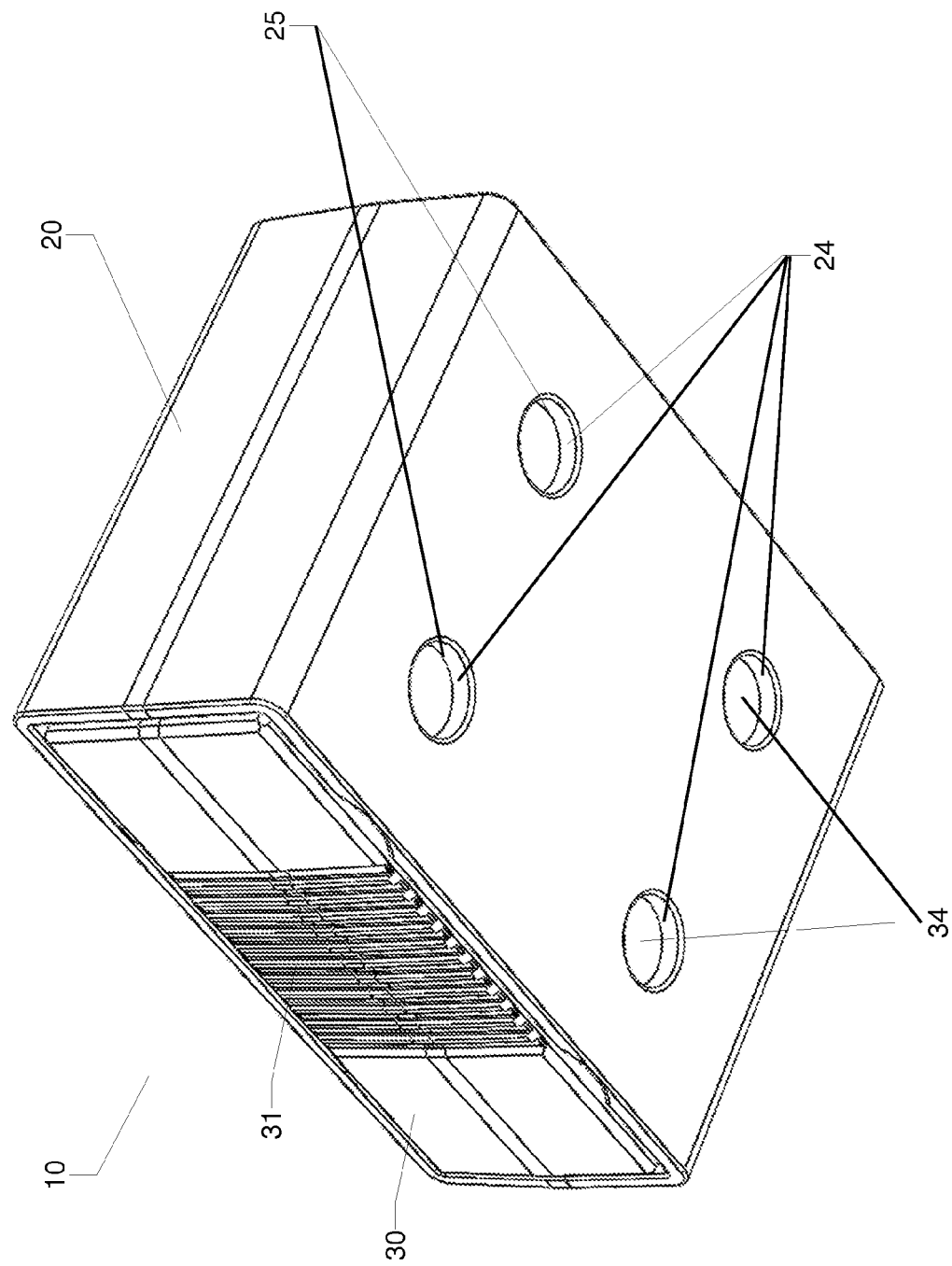

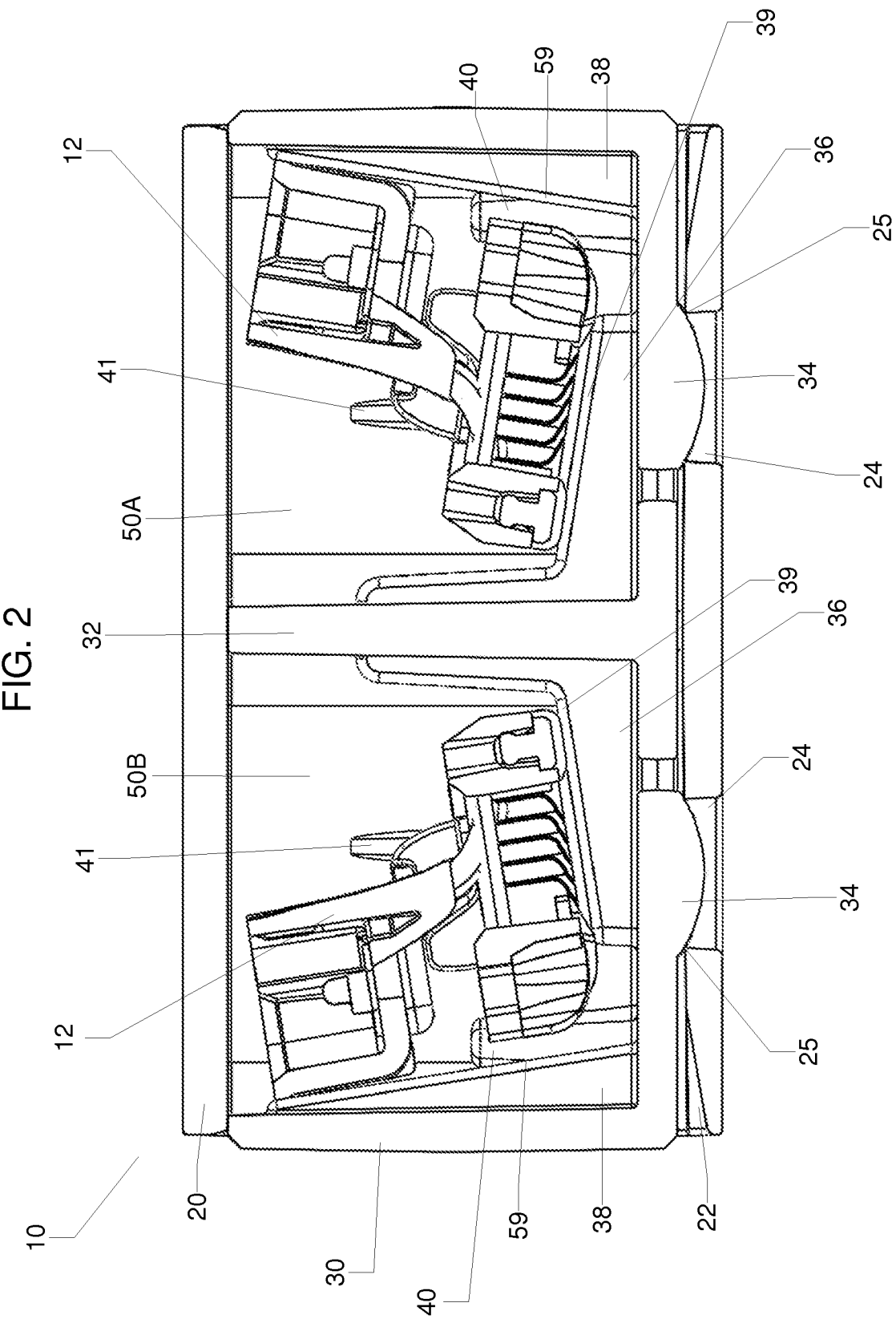

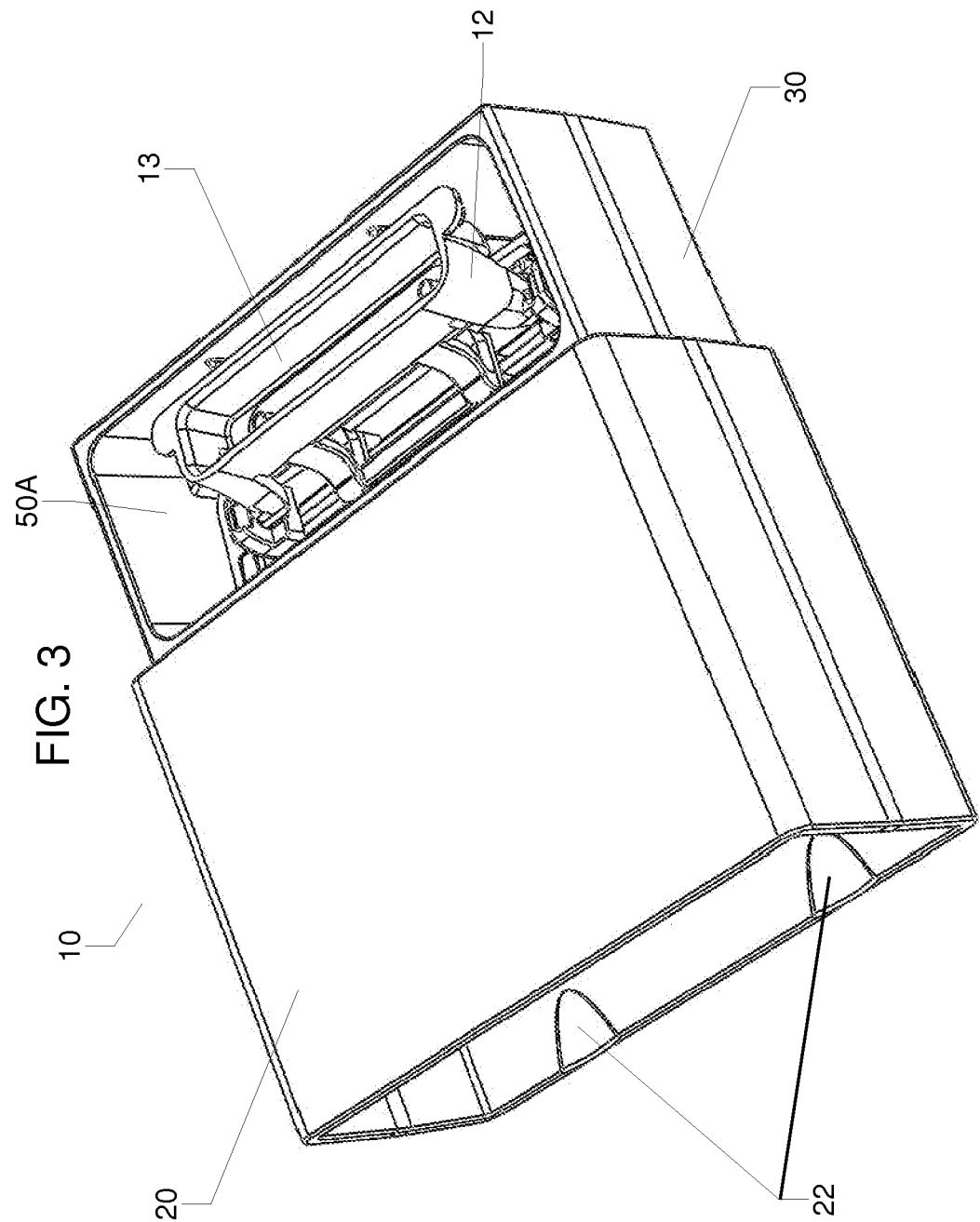

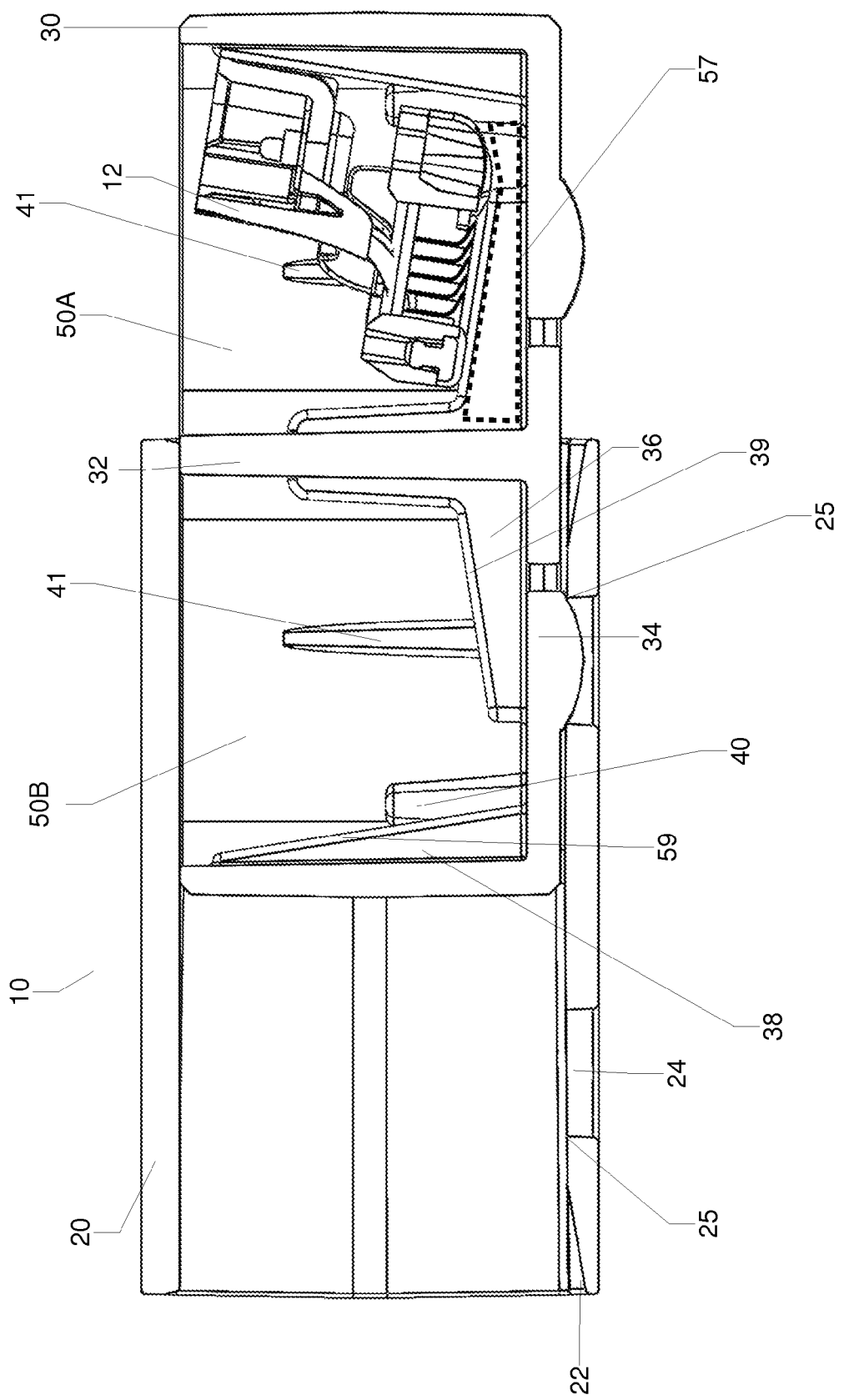

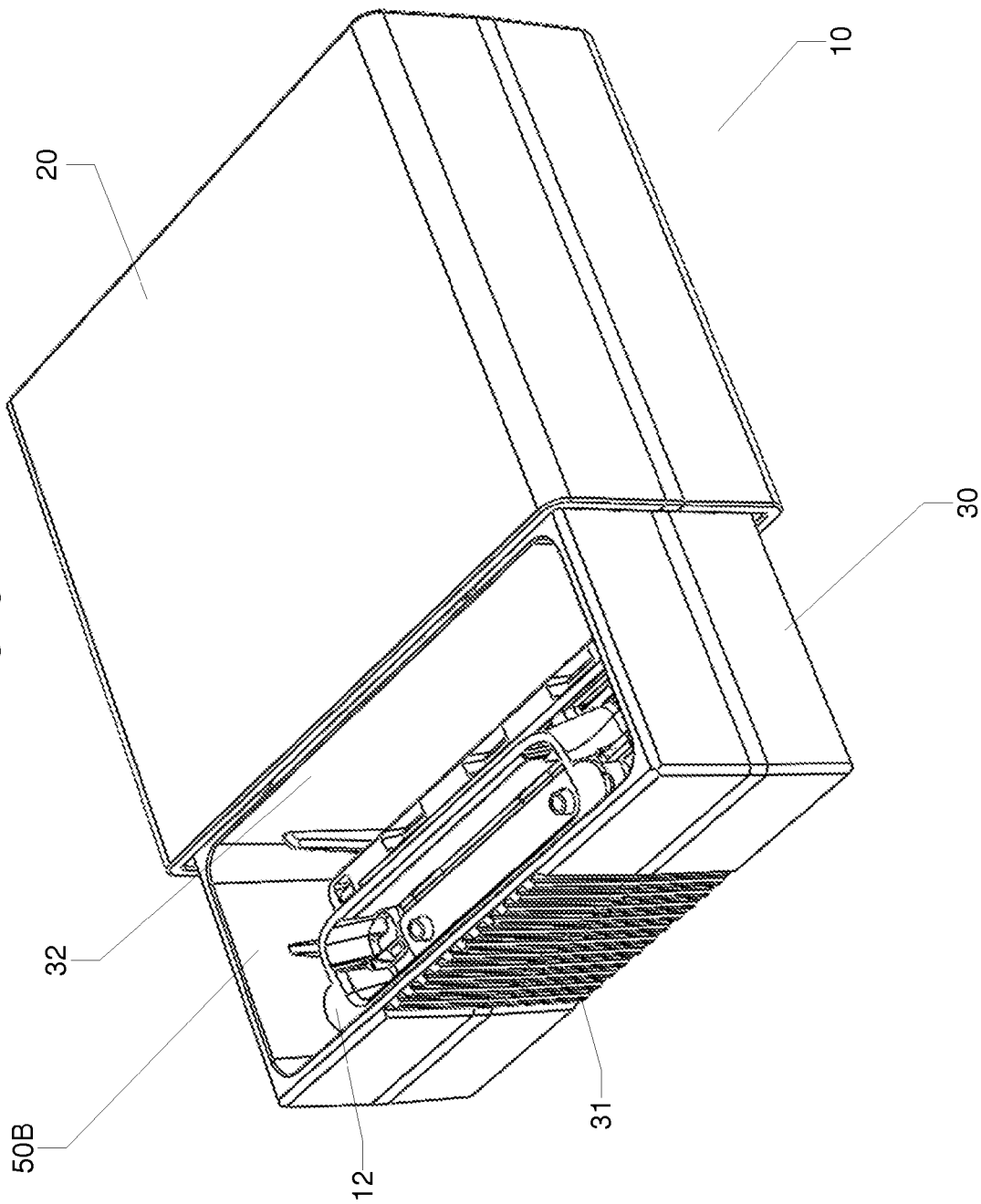

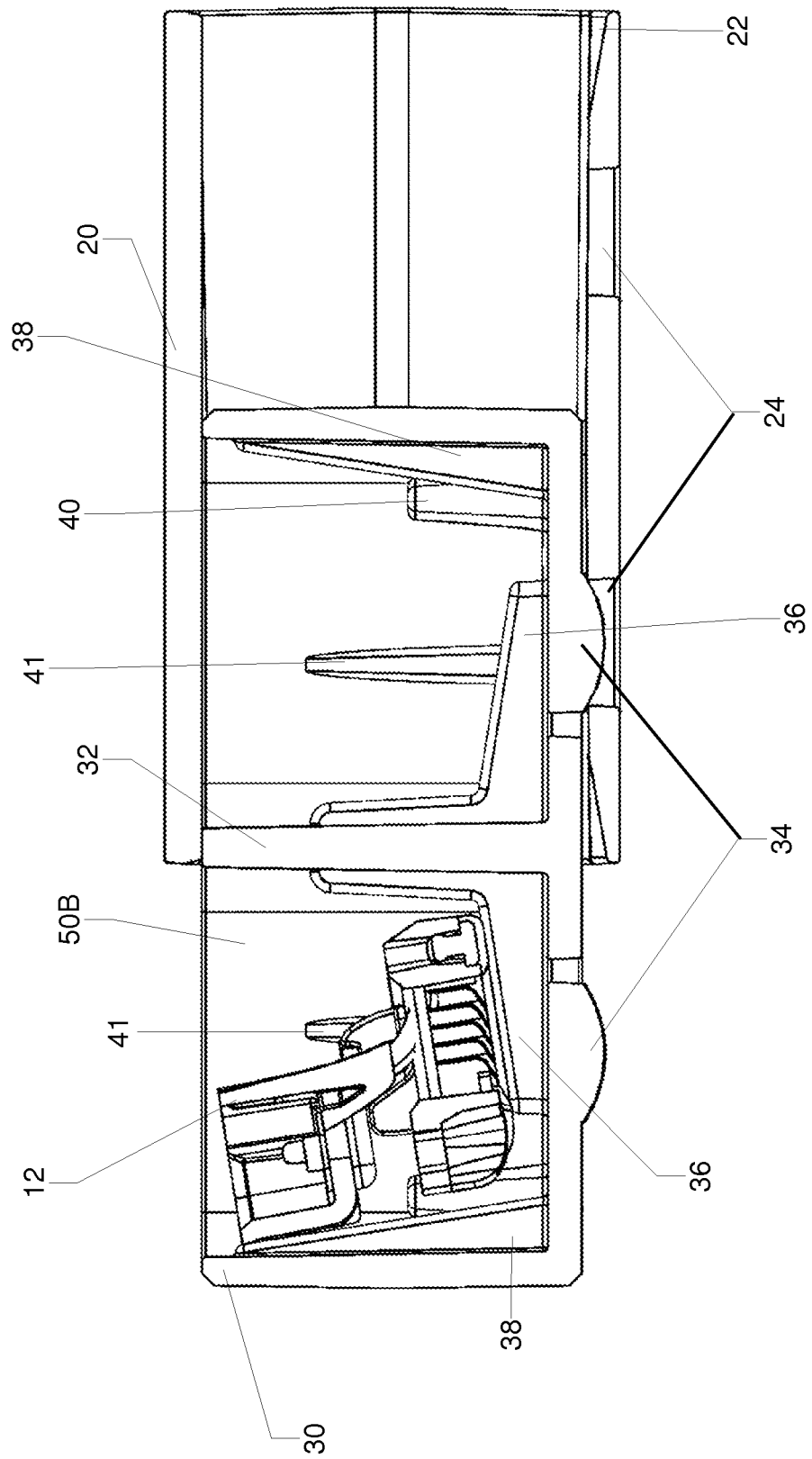

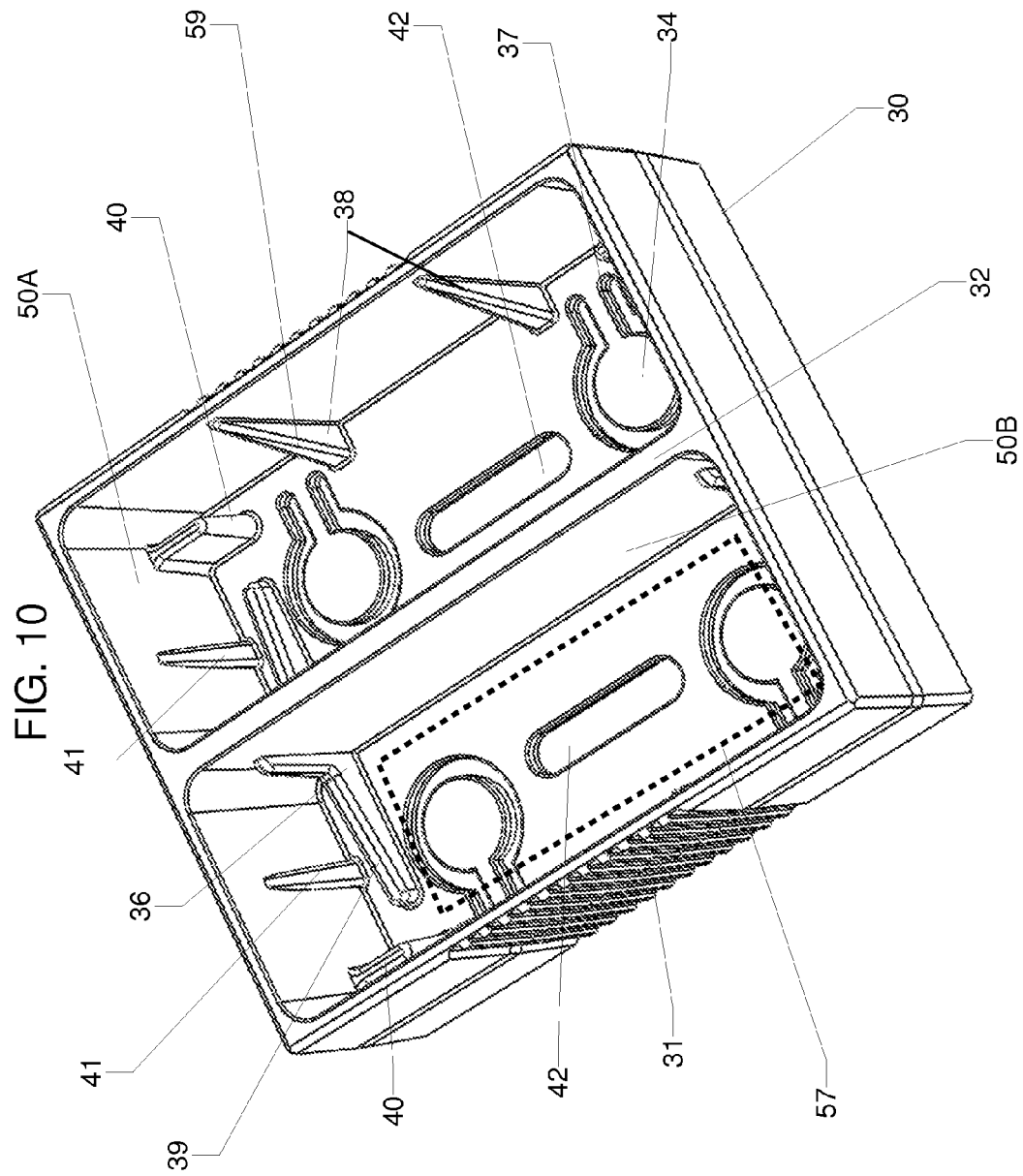

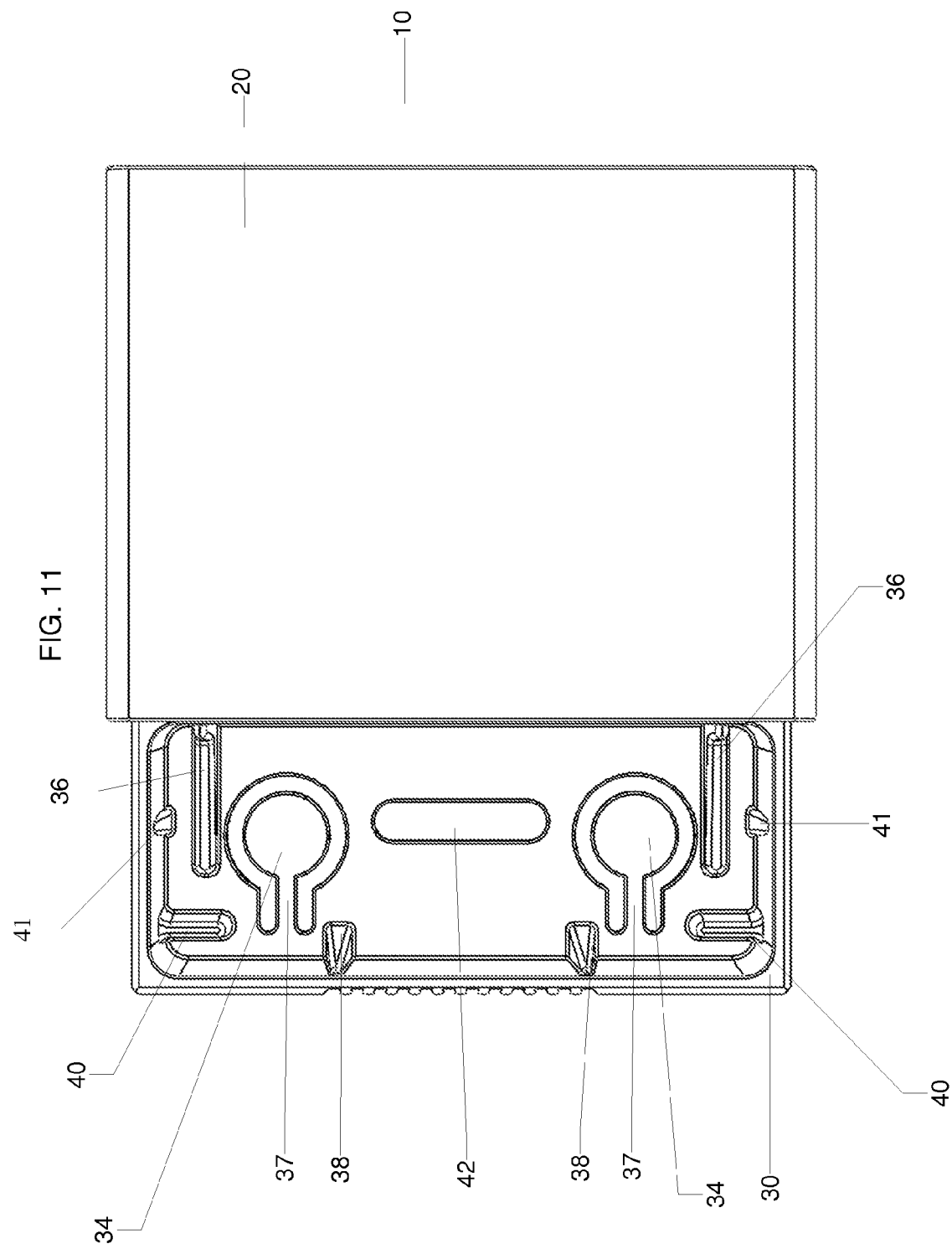

SHAVING ASSEMBLY DISPENSER

BACKGROUND

Some consumer shaving systems utilize detachable shaving assemblies that are adapted for use with a handle. The shaving assemblies can utilize a plurality of blades that dull from repeated use necessitating their eventual replacement. Replacement shaving assemblies can be purchased independently from the complete shaving system. Such replacement shaving assemblies are frequently packaged in a magazine configuration, i.e., is a container that serves to orient the shaving assembly to allow for proper engagement with the handle. The container protects the blades during transit and storage from damage by elevating the shaving assembly from the base of the container and holding the shaving assemblies fixedly in place in the container.

SUMMARY

In general, the invention features containers for consumer products, e.g. replaceable shaving assemblies. The containers are configured to hold multiple replaceable shaving assemblies and individually dispense them.

In one aspect the invention features a device comprising an outer container, and a sectioned inner container defining at least two compartments, each compartment being dimensioned to hold a shaving assembly. The inner container is disposed within the outer container and is movable relative to the outer container between a closed position, a first open position in which one of the shaving assemblies is exposed, and a second open position in which the other shaving assembly is exposed.

Some implementations include one or more of the following features.

The device may include an outer container and inner container which include cooperating features configured to releasably retain the inner container in each of its positions relative to the outer container. The cooperating features may comprise stop tabs on one of the containers that are configured to be received in openings in the other container. In some cases, the openings are disposed on the outer container and the stop tabs are disposed on the inner container. Some implementations of the device may include stop tabs which comprise a semi-spherical stop extending from a deflectable elongated member.

In some implementations, each compartment of the inner container may include features, e.g. angled features, configured to position the shaving assembly within the compartment. The angled features may include support members configured to support blades of the shaving assembly above a floor surface of the compartment. The angled features may be configured to position the shaving assembly favorably for interaction with a razor handle during mounting of the shaving assembly on the handle.

In some implementations, the outer container may be configured with open ends. The inner container may be open on the top. The inner container may include an opening configured to allow drainage from the inner container. The outer container may be configured to allow controlled movement of the inner container.

In some implementations of the device the outer container may include semi-parabolic lead-in features that are positioned to facilitate movement of the stop tabs when the inner container is moved between its first or second positions and its closed position, or during the assembly of the inner container into the outer container.

The invention also features methods of using the devices described herein. For example, in one aspect the invention features a method that includes (a) providing a device for storing shaving assemblies, the device including an outer container, and a sectioned inner container defining at least two compartments, each compartment being dimensioned to hold a shaving assembly, the inner container being disposed within the outer container and being movable relative to the outer container between a closed position, a first open position in which one of the shaving assemblies is exposed, and a second open position in which the other shaving assembly is exposed; (b) moving the inner container from its closed position into its first or second position; and (c) mounting the exposed shaving assembly on a razor handle.

The method may further include inserting a used shaving assembly into one of the compartments and moving the inner container to the closed position.

In another aspect, the invention features a shaving system comprising an outer container, a sectioned inner container defining at least two compartments, and a shaving assembly in each compartment, the inner container being disposed within the outer container and being movable relative to the outer container between a closed position, a first open position in which one of the shaving assemblies is exposed, and a second open position in which the other shaving assembly is exposed.

In some implementations, the shaving assemblies are free-floating within the compartments of the inner container, and the shaving assemblies are positioned in the compartments facing in opposite directions.

DESCRIPTION OF THE DRAWINGS

FIG. 1A is a perspective view of the device in the closed position from the bottom.

FIG. 2 is a sectional, planar view of the device.

FIG. 3 is a perspective view of the device in a first open position.

FIG. 7 is a planar, sectional view of the device in a first open position loaded with a shaving cartridge.

FIG. 8 is a perspective view of the device in a second open position loaded with a shaving cartridge.

FIG. 9 is a sectional, planar view of the device in the second open position.

FIG. 10 is a top, perspective view of the inner portion.

FIG. 11 is a top, planar view of the device in the second open position.

DETAILED DESCRIPTION

The present disclosure relates generally to consumer products and, in particular, to shaving systems with interchangeable shaving assemblies. In one embodiment, the present disclosure features a reusable consumer product system having a container that securely holds interchangeable shaving assemblies. The container is designed to protect the shaving assemblies during transit, e.g. to the point of use, and storage, and to allow safe storage and disposal of used cartridges.

Figure 1:
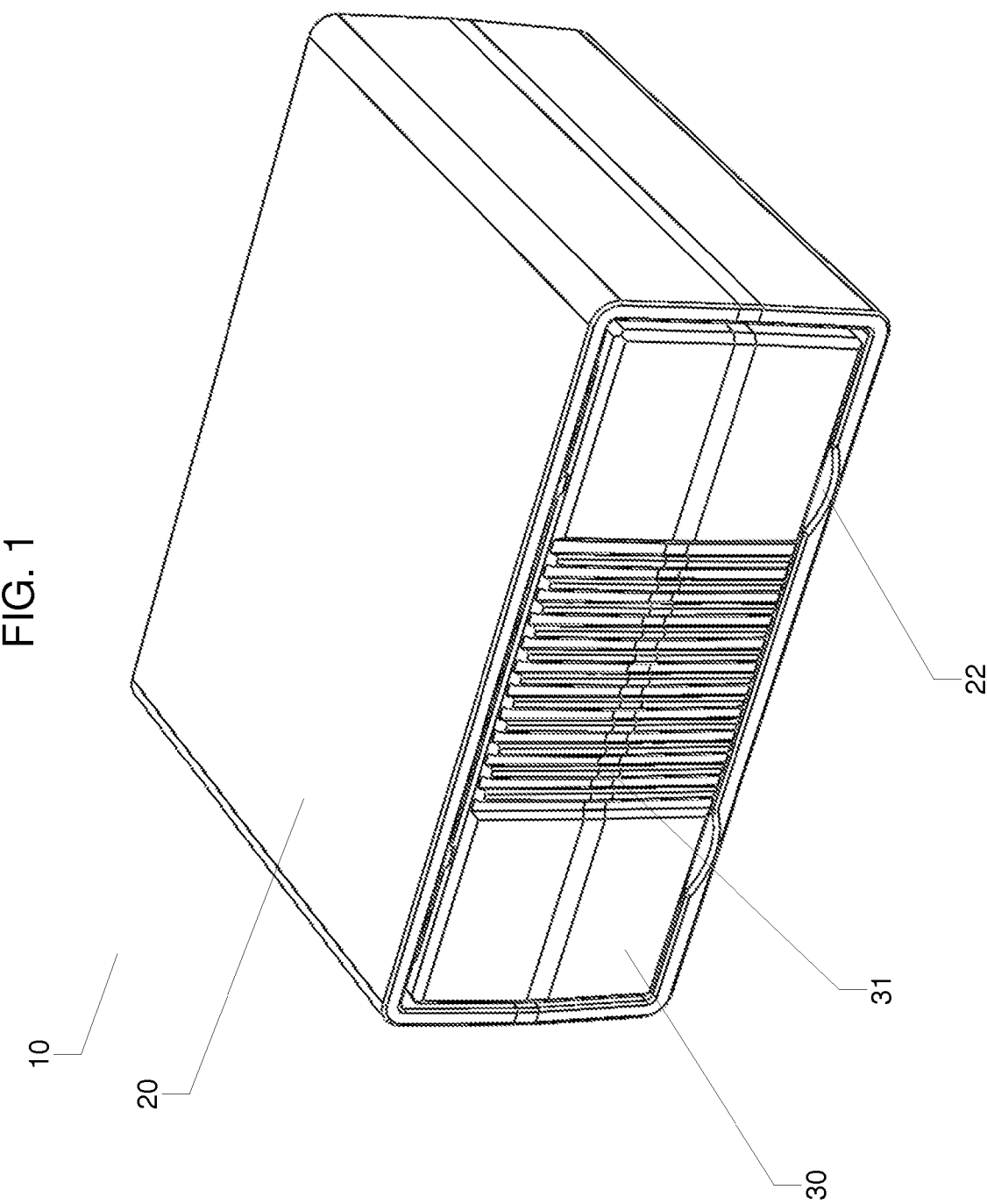
FIG. 1 is a perspective view of the device in the closed position.

Referring to FIG. 1, a container 10 includes an outer portion 20 and an inner portion 30. The outer portion 20 is configured to receive the inner portion 30 similar to a cabinet and a drawer. A tactile element 31, e.g., in the form of alternating raised and recessed ridges, is configured in the center of the inner portion 30. An additional tactile element is configured on the opposite end of the inner portion 20 (not shown). The outer portion 20 features four lead-in features 22 each of which is shaped as an elliptic paraboloid. The lead-in features will be discussed in detail at a later point.

Figure 10A:
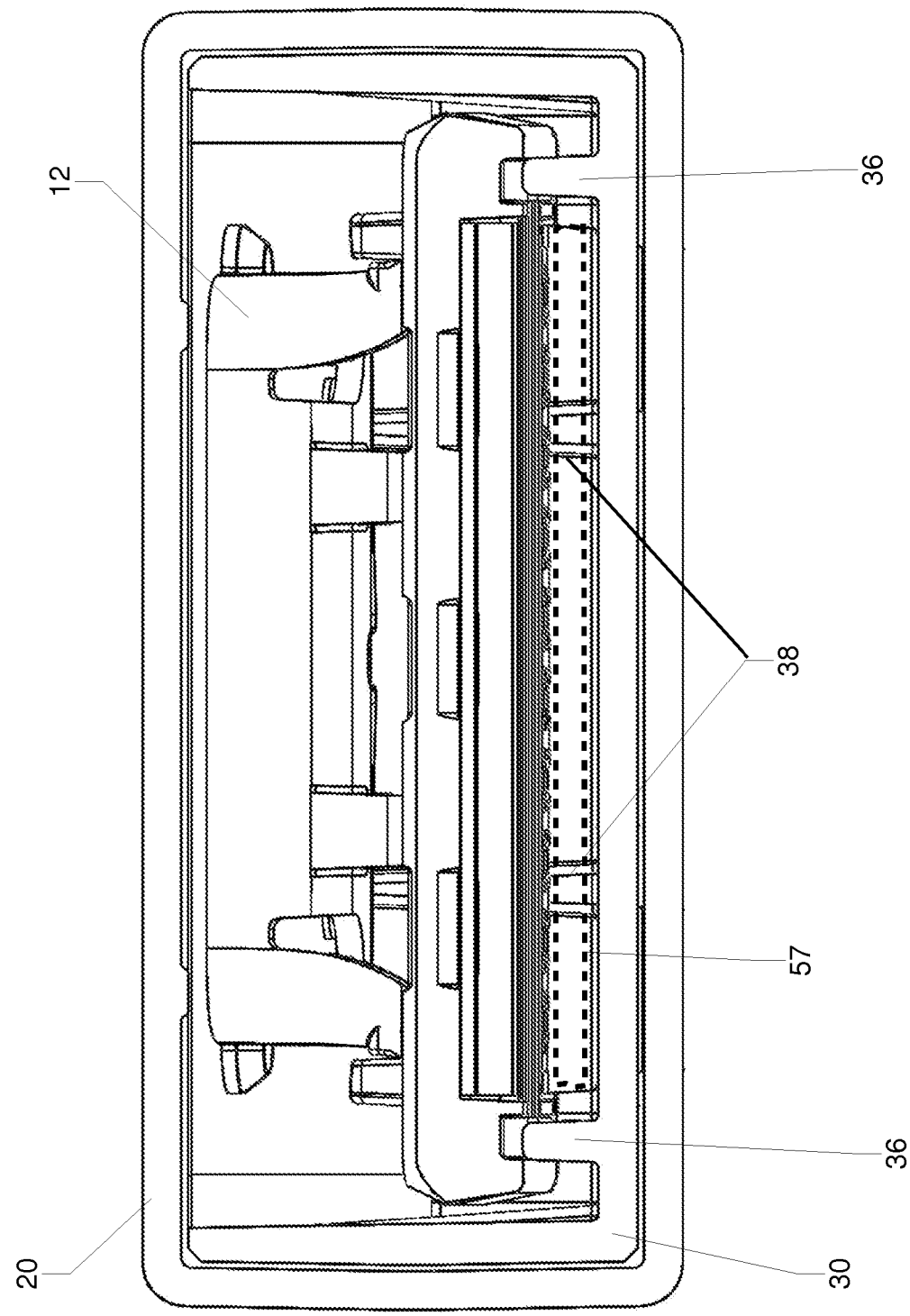
FIG. 10A is a sectional view of the device.
Figure 12:
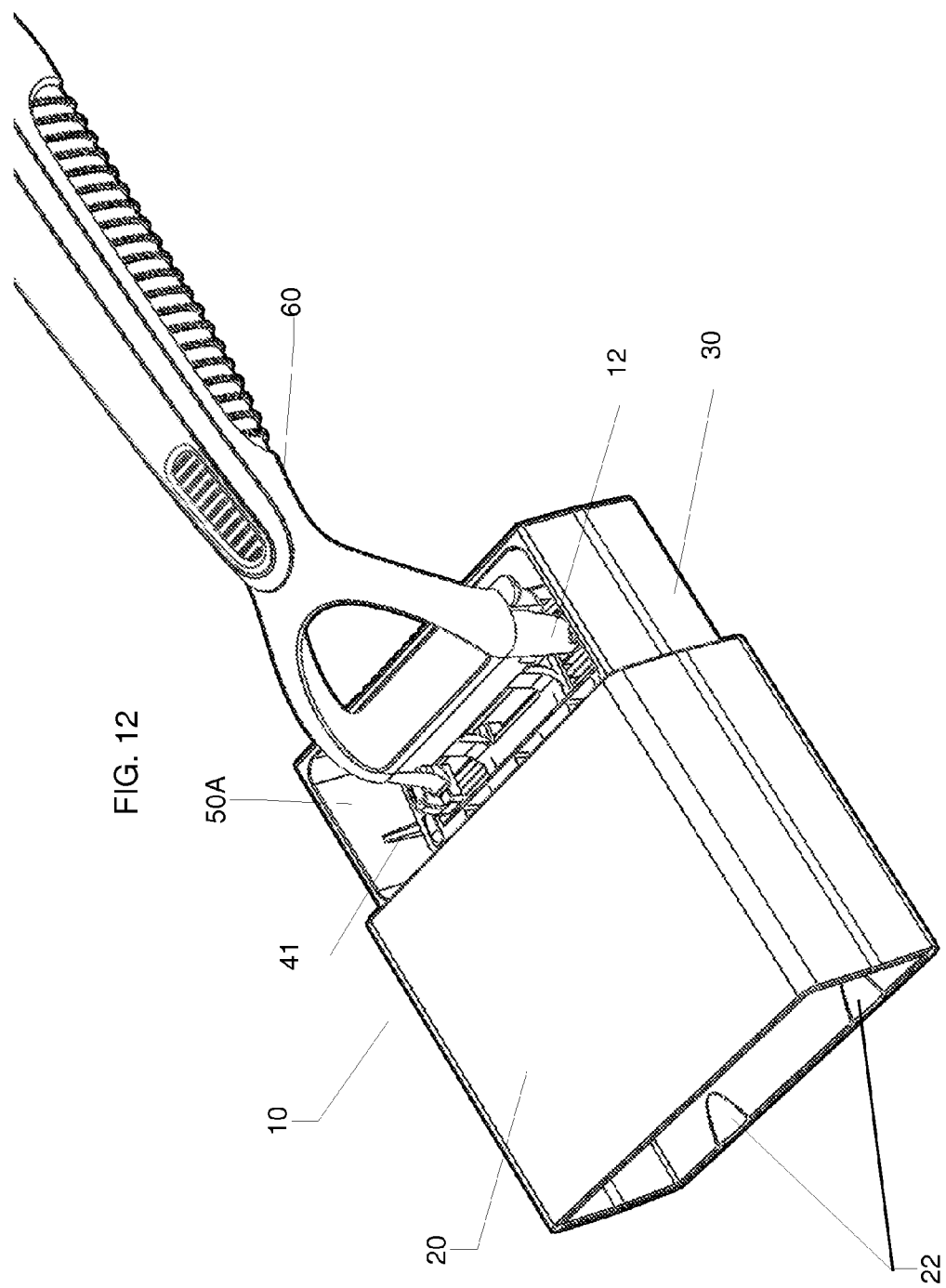
FIG. 12 is a top, perspective view of the device with a handle engaging the shaving cartridge.

Referring to FIGS. 2 and 10, the inner portion 20 is divided into two equal sections by divider 32, creating two distinct cavities 50A, 50B (FIG. 10). The cavities 50A and 50B are mirror opposites of each other. The cavities 50A and 50B are each dimensioned to receive and hold a shaving assembly 12. Each cavity has raised features 36, 38, 40 that orient the shaving assembly 12 in a predetermined position to allow for proper alignment with handle (60) (FIG. 12). As shown, the shaving assemblies 12 are positioned facing opposite directions in inner portion 30. There are two raised features 36 on the floor of the cavity 50B that are positioned so as to be outboard of the blades of the blade unit and provide an open area 57 under the blades (FIGS. 7, 10, 10A). Each of the raised features 36 has an angled surface 39 that positions the shaving assembly 12 at generally a 10° angle with respect to the plane of the floor. There are two raised features 38 on the back wall of the cavity 50B that taper as they extend vertically. Each of the two raised features 38 has an angled surface 59 that positions the shaving assembly 12 at an angle with respect to the plane of the back wall. The angled surfaces 39 of raised features 36 are perpendicular to the angled surfaces 59 of raised features 38. As a result, the openings of the interface elements 13 are positioned so that the appendage on the handle 62 (FIG. 12) can be easily inserted into the opening of the interface element when the long axis of the handle is generally parallel to the top surface (e.g. plus or minus within) 10° of the outer portion 20 (FIG. 12). This positioning is particularly advantageous when the shaving assembly 12 is attached to the handle by a magnetic force, e.g. as described in U.S. application Ser. No. 13/802,546 filed on Mar. 13, 2013 the full disclosure of which is incorporated by reference herein.

Each cavity also includes two stop features 40 positioned to limit horizontal movement of the shaving assembly 12. The stop features 40 are positioned in the cavity 50B so as not to inhibit the movement of tab 34 when the inner portion 30 is moved between its positions, e.g. when opened or closed, as discussed below. These features are included because the shaving assembly 12 is free floating within the cavities 50A, 50B. The lack of any retaining features within the cavity facilitates the use of magnetic force to attach the shaving assembly to the handle.

Referring to FIGS. 10 and 11, each cavity also includes two raised features 41 that extend into the cavity from the sidewalls. Raised features 41 eliminate lateral movement of the shaving assembly 12 within the cavity during shipment or storage.

Referring to FIGS. 7, 10 and 10A, raised features 36 hold the shaving assembly 12 in an elevated position with respect to the base of the cavities 50A, 50B creating an open area 57 between the blades and the bottom of the cavities. In addition, the raised features 36 help position the shaving assembly for handle insertion as seen in FIG. 12. This elevated position minimizes blade edge damage due to contact with the base of the cavity 50A, 50B. In addition, the elevated position created by the raised features 36 allows air to circulate more effectively around the shaving assembly 12 and allows for excess water to drain from the shaving assembly 12. The raised features 36 are positioned to contact the shaving assembly 12 in such a manner that the blades are untouched, preventing damage to the blade edges due to contact with surfaces. Each cavity 50A, 50B also includes a cutout 42 (FIG. 11) in the floor in the open area 57 under the blades. This cutout 42 serves as a portal for water and air, further enhancing water drainage and humidity equalization.

Figure 5:
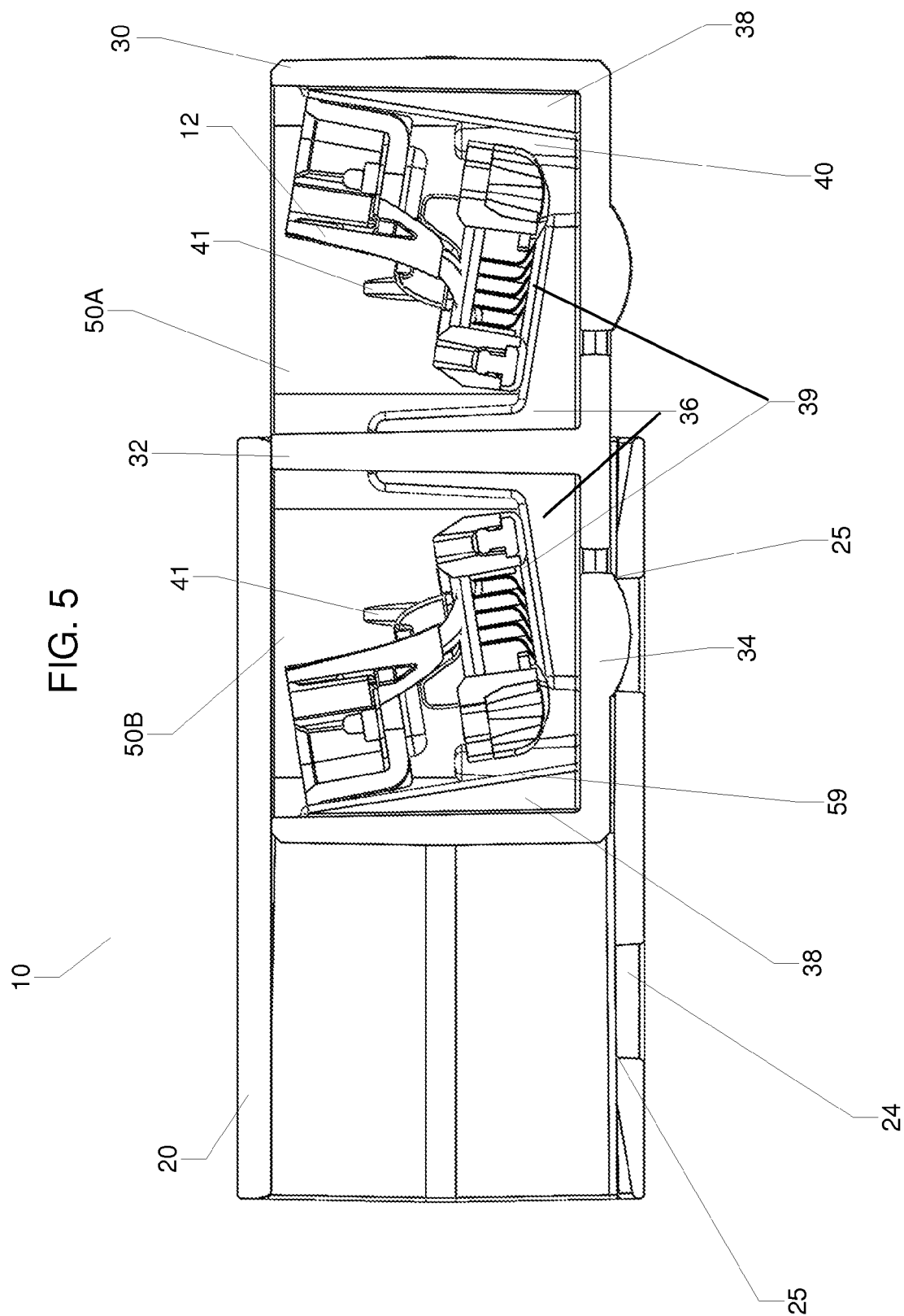
FIG. 5 is a sectional, planar view of the device in a first open position.
Figure 6:
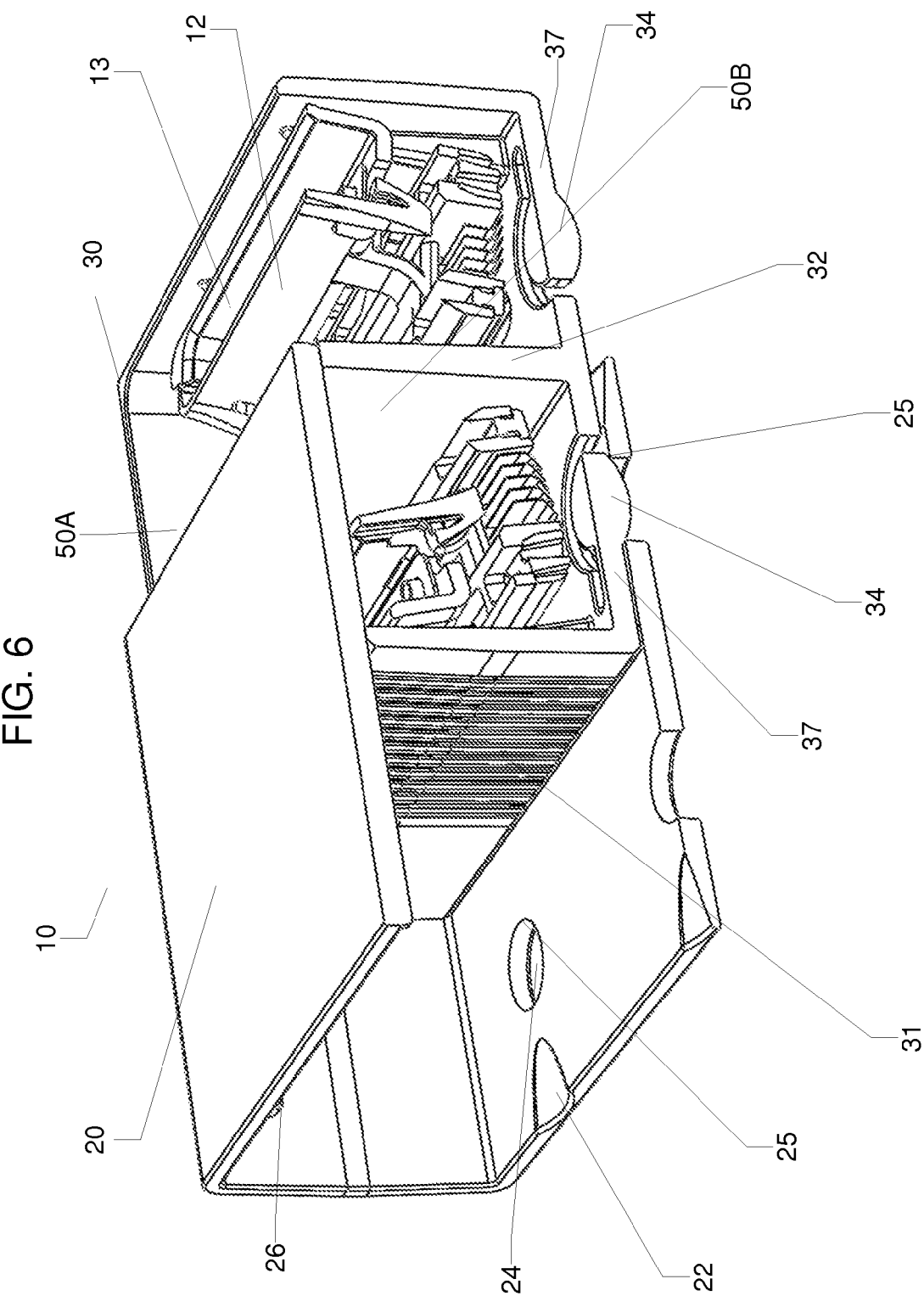
FIG. 6 is a sectional, perspective view of the device in a first open position.

Referring to FIGS. 3 and 5, the inner portion 30 is shown in a first open position with respect to the outer portion 20, in which a shaving assembly 12 is exposed. The consumer moves the inner portion from the closed position, shown in FIG. 1, to the open position shown in FIG. 3, e.g., by pushing against tactile element 31 while restraining movement of the outer portion 20. When opening the container 10, two pairs of semi-spherical stop tabs 34 deflect upwards out of a corresponding pair of retaining holes 24 into the open space 57 (FIGS. 7, 10, 10A) under the shaving assembly 12. This upward deflection of the stop tabs 34 is permitted by the upward flexing of elongated fingers 37, from which the tabs 34 extend, and by the stop tabs and elongated fingers being separated from the floor of the inner container by a cut out channel. When opening the container 10, the semi-spherical surface of the tab 34 allows each tab to defect over rim 25 of the corresponding hole 24 (FIGS. 3 and 5). The tab and opening have complementary shapes that readily allow sliding engagement and disengagement.

Referring to FIGS. 3 and 5, to close the container 10 the user moves the inner portion 30 in the opposite direction, back into the outer portion 20. This movement is assisted by lead-in features 22, which are positioned side by side on the edge of the inner surface of the base of outer portion 20. (While only a single pair of lead-in features is shown in FIG. 3, another pair is disposed in the same manner on the opposite edge of the outer portion 20.) Tabs 34 are configured with raised arcuate surfaces that are complementary to the lead-in features 22. The raised surfaces of the tabs extend down from the bottom surface of the inner portion 30. As discussed above, fingers 37 allow tabs 34 to flex vertically with relation to the floor of the inner portion 30. When closing the container 10, the lead-in features 22, which are elliptic paraboloid in shape, guide tabs 34 into a tensioned position until alignment with holes 24 is achieved which represents the closed position. When the container 10 is in the closed position, as shown in FIG. 2, there are four tabs 34 which are engaged in four corresponding holes 24. When the container 10 is in the open position, as shown in FIG. 5, only two tabs 34 are engaged in two corresponding holes 24.

Referring to FIGS. 6, 7, 8, 9, the container 10 can be positioned in two distinct open positions in each of which a single shaving assembly 12 is exposed in a proper loading position. The lead-in features 22, the holes 24, the tabs 34, and fingers 37, work together in concert to create the two distinct open positions and a distinct closed position. In each of these positions, the engagement of the cooperating holes and tabs serves to maintain the inner portion 30 in a stable, fixed position relative to the outer portion 20 until pressure is applied by the consumer.

Figure 4:
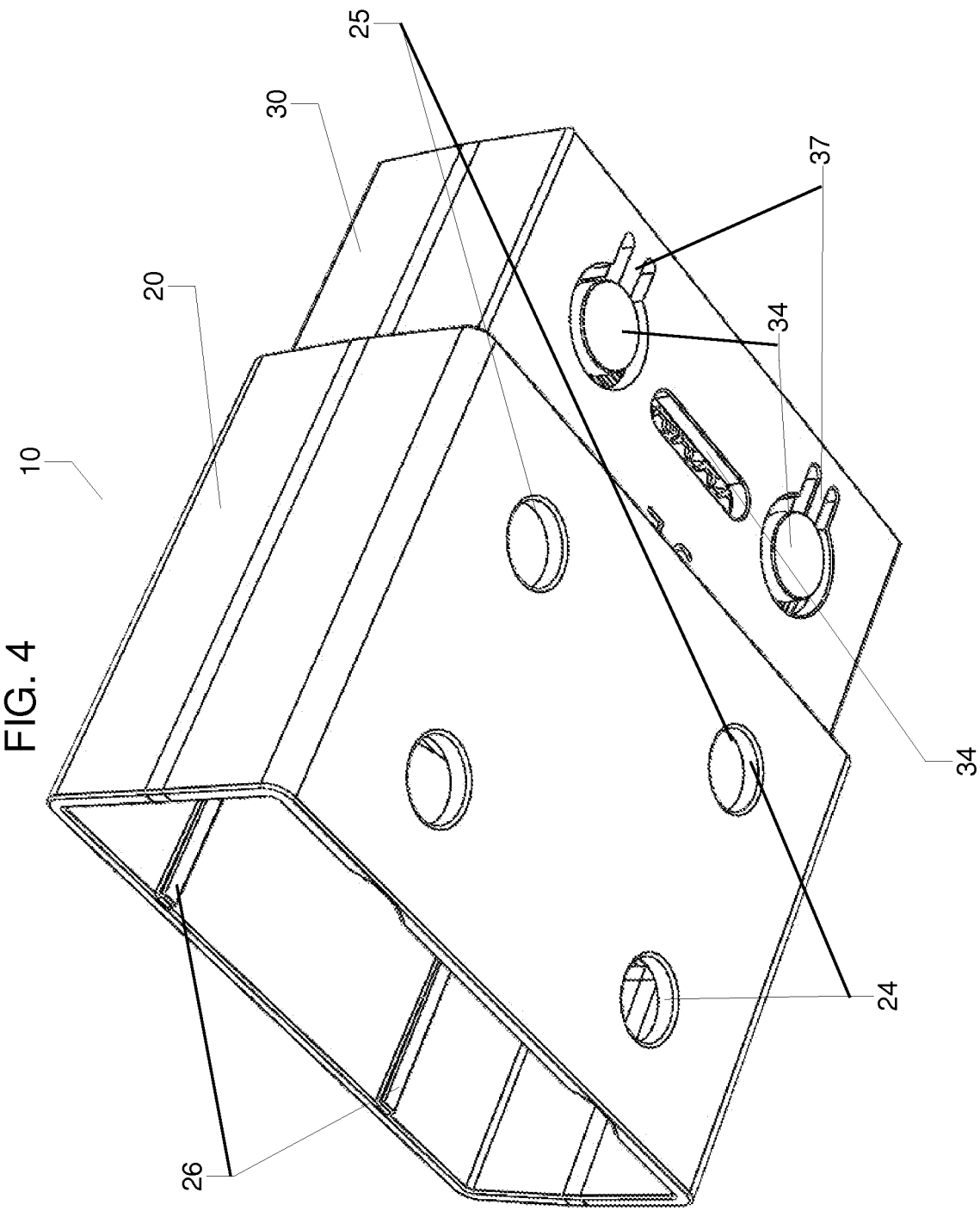
FIG. 4 is a perspective view of the bottom of the device in a first open position.

The stability of the engagement of the tabs in the holes is enhanced by rails 26, shown in FIG. 4, that extend down from the inner surface of the top of the outer portion 20. These rails enhance the interaction of the tabs 34, the holes, 24, and the lead-in features 22 by eliminating unwanted vertical movement between the inner portion 30 and the outer portion 20. This interaction helps to hold the inner portion 30 (drawer) open when dispensing a shaving assembly 12. Similarly, this interaction helps to hold the drawer closed when not in use, e.g. during travel or storage. The container 10 is designed to be open and closed multiple times. This allows a used shaving assembly to be returned to the container, e.g. between uses or for safe disposal.

In addition, the rails 26 minimize the friction incurred while moving the inner portion 30 with respect to the outer portion 20. The rails 26 enhance the movement of the inner portion 30 by limiting the contact surface area between the inner and outer portions, thus reducing friction.

In some implementations, the force needed to open the container 10 with all four stops engaged is approximately between 100 g to 300 g. With two stops engaged, as when closing the container 10, the force would be approximately between 50 and 150 g. The force is measured using a linear force gauge to push on the center of the front wall of the inner portion while holding the outer portion in a fixed position until movement is achieved.

The container 10 can be made of any suitable material including, for example, polyethylene terephthalate (PET or PETE), high density (HD) PETE, thermoplastic polymer, polypropylene, oriented polypropylene, polyurethane, polystyrene, acrylonitrile butadiene styrene (ABS), polyvinyl chloride (PVC), polytetrafluoroethylene (PTFE), polyester, metal, synthetic rubber, natural rubber, silicone, nylon, polymer, wood, antibacterial or antimicrobial materials, insulating, thermal, other suitable sustainable or biodegradable materials, e.g., cardboard, or any combination thereof.

OTHER EMBODIMENTS

A number of embodiments have been described. Nevertheless, it will be understood that various modifications may be made without departing from the spirit and scope of the disclosure.

For example, another embodiment could feature a container that is configured to hold and dispense other replaceable consumer products, e.g. toothbrush heads.

Figure 13:
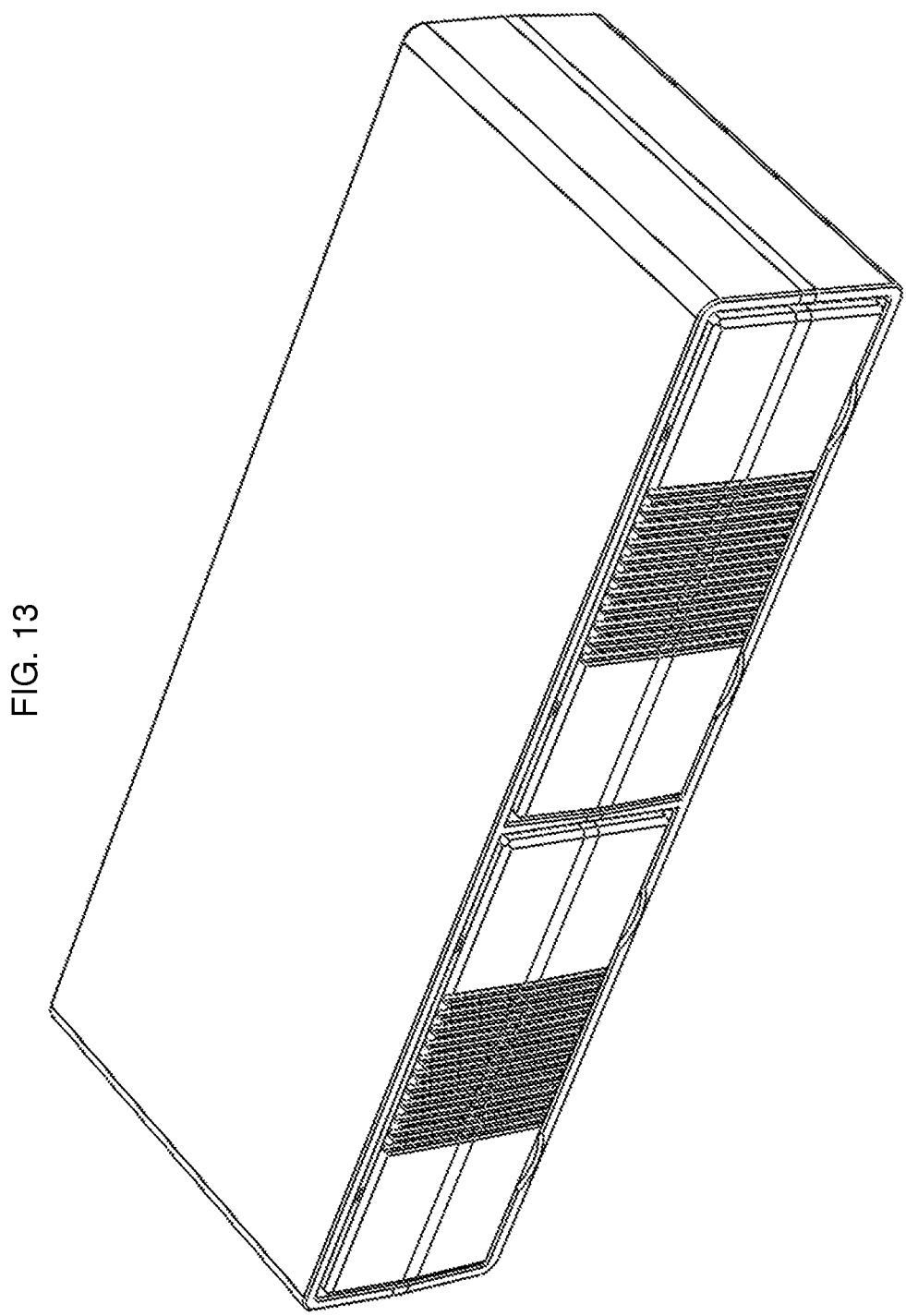
FIG. 13 is a top, perspective view of an alternate embodiment showing two drawers in the closed position.
Figure 14:
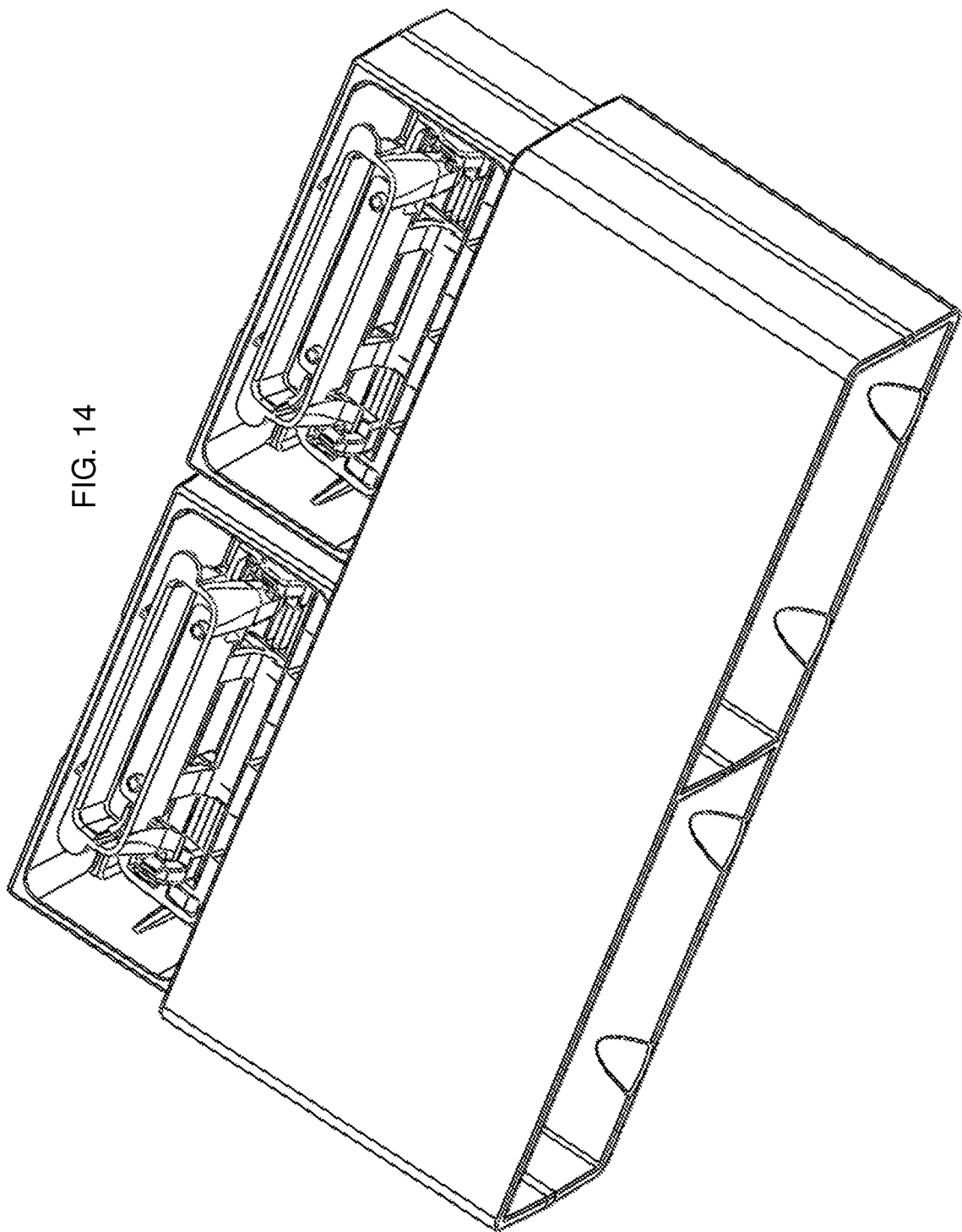
FIG. 14 is a top, perspective view of an alternate embodiment showing two drawers.
Figure 15:
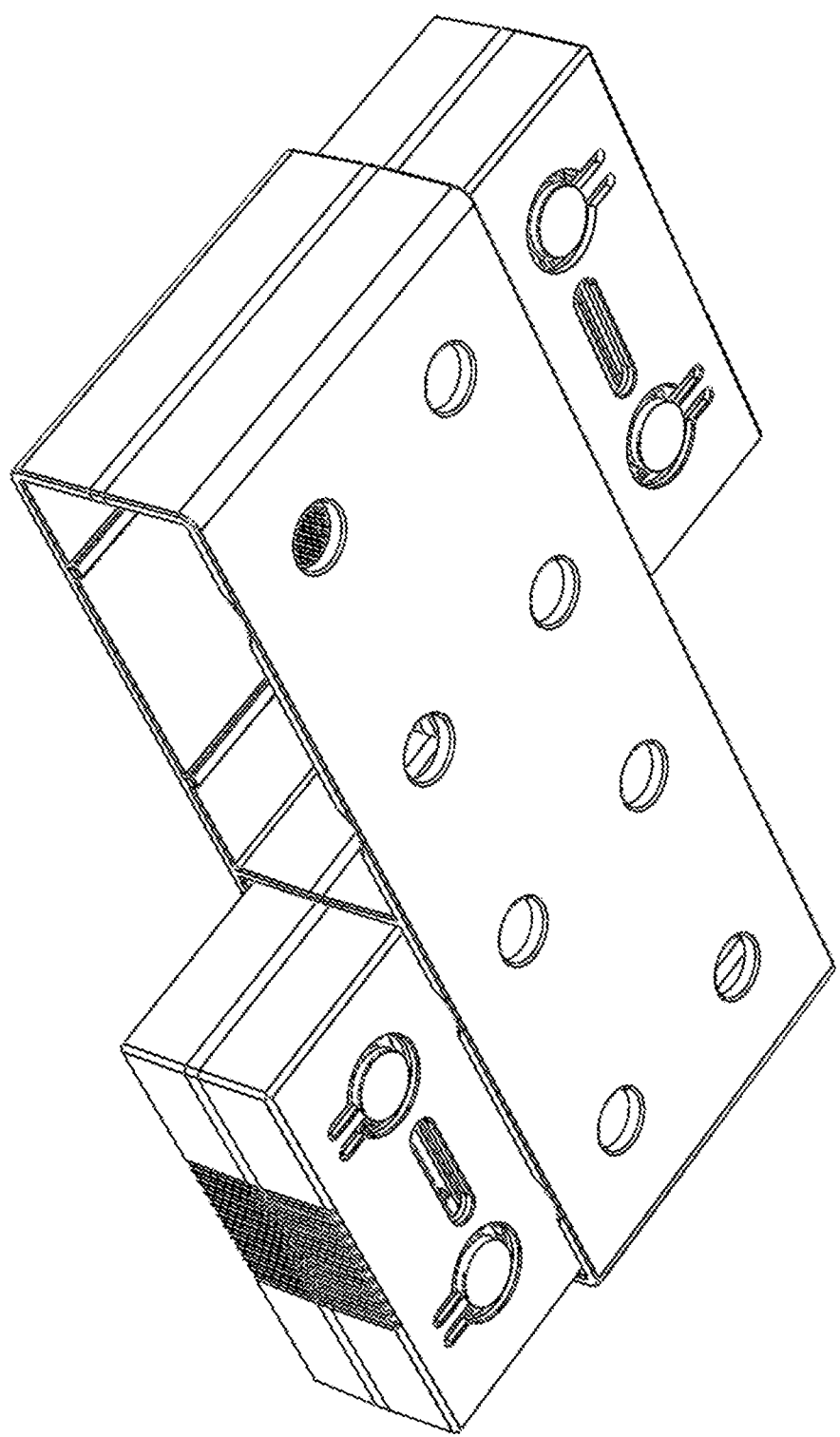
FIG. 15 is a bottom, perspective view of an alternate embodiment showing two drawers in the two open positions.

Another embodiment could feature a container that is configured to accommodate a greater number of shaving assemblies. This could be accomplished in a variety of ways, e.g., positioning two or more drawers next to each other wherein each drawer is configured to hold two shaving assemblies, as shown in FIGS. 13-15. An alternate embodiment could feature a single drawer that is configured to hold more than two shaving assemblies, e.g. four shaving assemblies which are positioned in four separate compartments so that one pair of the shaving assemblies is oriented in the same direction while the other pair is oriented in the opposite direction. In addition, the container could be scaled to accommodate either larger or smaller dimensioned shaving assemblies. For example, shaving assemblies intended for used on large surface area body parts, i.e. the legs, chest, back, etc.

Another embodiment could feature differently configured stop tabs and corresponding holes. For instance, the stop tabs and holes could be designed to be any complementary shape that would provide for the desired releasable locking interaction. Generally the stop tabs will have a convex shape.

In addition, another embodiment could feature more or fewer stop tabs and corresponding holes. For example, the outer container could be configured with three holes in a line that would represent a first open position, a closed position, and a second open position and a single, complementary stop tab that would engage each of the holes in a similar manner to that described above.

Another embodiment could feature additional rails 26 (FIG. 4) configured either on the inner, horizontal and/or vertical surfaces of the outer portion 20 or on the outer, vertical surfaces of the inner portion 30. The additional rails would improve the sliding of the inner portion 30 with respect the outer portion 20 by reducing friction and minimizing rotation of the inner portion 30 produced during opening or closing.

Another embodiment could feature compartments that are of different sizes. The inner compartments could be configured to hold two differently sized shaving assemblies. For example, one cartridge could be smaller, intended for facial use, while the other cartridge could be larger, intended for use on larger, surface area body features, i.e. the chest, back, etc.

In another embodiment, the container could include only a single compartment, and/or contain only a single shaving assembly when sold. For example, the shaving system would be offered to the consumer with a replaceable shaving assembly already attached to the handle and a single, replacement shaving assembly would be housed in the container. A single-compartment container could also be used with larger shaving assemblies, e.g., for female or body shaving. In some cases, these single compartment containers would closely resemble the two compartment containers discussed above in terms of the arrangement of complementary stop features.

Another embodiment of the inner portion could feature alternatively configured raised elements to ensure proper positioning of the shaving assembly while in transit, during storage or during engagement with a handle.

In some cases, the lead-in features may be omitted or made smaller if they are necessary for initial assembly of the inner portion into the outer portion.

Accordingly, other embodiments are within the scope of the following claims.

What is claimed is:

1. A shaving system comprising:
an outer container,
a sectioned inner container defining at least two compartments and having a front and a back wall, a divider, and a floor, and
a shaving assembly in each compartment, each shaving assembly including an interface element having an opening configured to receive a handle,
the inner container being disposed within the outer container and being movable relative to the outer container between a closed position, a first open position in which one of the shaving assemblies is exposed, and a second open position in which the other shaving assembly is exposed,
wherein the inner container includes supporting features disposed on the floor and the shaving assemblies are positioned in the compartments facing in opposite directions, the opening of one of the interface elements is positioned closer to the front wall than to the divider and the opening of the other interface element is positioned closer to the back wall than to the divider.

2. The shaving system of claim 1 wherein the shaving assemblies are free-floating within the compartments of the inner container.

3. The shaving system of claim 1 wherein each of the shaving assemblies includes a blade unit having a long axis, and the compartments are dimensioned such that the long axes of the blade units are disposed perpendicular to a direction of travel of the inner container between the open positions and the closed position.

4. The shaving system of claim 1 wherein the outer container and inner container include cooperating features configured to releasably retain the inner container in each of its positions relative to the outer container.

5. The shaving system of claim 4 wherein the cooperating features comprise stop tabs on one of the containers that are configured to be received in openings in the other container.

6. The shaving system of claim 1 wherein each of the shaving assemblies includes a blade unit having a plurality of blades, and the supporting features are configured to support the blades above the floor of the compartment and to support a lower surface of each blade unit at an angle with respect to the floor.

* * * * *